United States Patent [19]

Sloane

[11] Patent Number: 5,017,123
[45] Date of Patent: May 21, 1991

[54] KNOCKOUT BAR MOUNTING FOR INJECTION MOLDING MACHINES

[76] Inventor: Paul G. Sloane, 39830 86th St. W., Leona Valley, Calif. 93551

[21] Appl. No.: 490,036

[22] Filed: Mar. 7, 1990

[51] Int. Cl.⁵ .............................................. B29C 45/40
[52] U.S. Cl. ..................................... 425/182; 249/67; 264/334; 425/556; 425/444
[58] Field of Search ........................... 249/66.1, 67, 68; 425/436, 444, 182, 554, 556; 264/334, 336

[56] References Cited
U.S. PATENT DOCUMENTS

| | | |
|---|---|---|
| 3,687,591 | 8/1972 | Perego ................................ 425/556 |
| 3,737,268 | 6/1973 | Ryder ..................................... 249/68 |
| 4,545,753 | 10/1985 | Hehl ...................................... 425/436 |
| 4,645,446 | 2/1987 | Hehl ...................................... 425/444 |
| 4,687,434 | 8/1987 | Beglinger ............................... 249/68 |
| 4,767,302 | 8/1988 | Okamoto .............................. 425/556 |
| 4,929,170 | 5/1990 | Boskovic ............................... 425/436 |

*Primary Examiner*—Willard Hoag
*Attorney, Agent, or Firm*—Donald D. Mon

[57] ABSTRACT

The invention provides means for removably attaching ejector pins for an injection molding machine to a movable knock-out plate. The knock-out plate has slidably attached thereto a latch plate to engage ejector pin heads and thereby secure them to the knock-out plate.

6 Claims, 3 Drawing Sheets

KNOCKOUT BAR MOUNTING FOR INJECTION MOLDING MACHINES

FIELD OF THE INVENTION

This application relates to the mounting of knockout bars in injection molding machines.

BACKGROUND OF THE INVENTION

Injection molding machines characteristically mount at least two die parts. One die part is mounted to the machine frame, and the other part is mounted to a slide or carriage to close and to open the mold. The classical construction also includes knockout bars to contact a completed part to eject the part from the mold. These can more properly be regarded as ejector pins, and to avoid confusion in this specification they will be described as ejector pins, rather than as knockout bars. These ejector pins are not the pins which are the subject of this invention.

Classical molding machines also include a plate called a knockout plate. This is a very substantial rigid plate which floats relative to the movable mold part in order to actuate the ejector pins.

However, the linkage between the knockout plate and the ejector pins is not a direct one. Instead the ejector pins are mounted to still another plate, which in turn is contacted by knockout bars carried by the knockout plate.

The arrangement of the ejector pins is arbitrary, and is dictated by the configuration of the individual mold. However, the knockout bars which cause the ejector pins to eject the product are located on an array defined by a national standard. This is standard defines where the knockout bars can be mounted. It is not usual for all of these locations to carry a knockout bar at the same time. Instead, again depending on the mold characteristics, perhaps only a central pin will be used, or some pattern of two, three or more of them will be placed at proper locations in the pattern.

The point is that each time a mold is changed, it is likely that the pattern of knockout bars will also have to be changed. It Is usual for the knockout bar to be held to one side of the knockout plate by a headed bolt passed through a hole in the plate and threaded into the knockout bar. This does not appear to be a particular problem, except to the person who must remove and replace the knockout bars. He regards this as a difficult and onerous task. The knockout plate is not removed from the machine for the purpose, and access to the regions where the job is done is very restricted. The worker must work from the side reaching into a narrow region with a wrench of substantial size, often nearly blindly.

It is an object of this invention to provide mounting means which can conveniently be manipulated from outside of this narrow region, preferably by energizing a fluid motor, so that the task is reduced to merely to pulling knockout bars out of sockets where they are not needed, plugging knockout bars into sockets where they are needed, and then actuating a latch to hold them in the socket or sockets.

This arrangement eliminates the inconveniences and delays of the prior art, and enables the knockout bar array to be changed in a matter of only a few minutes instead of the hour or more required for most known machines.

BRIEF DESCRIPTION OF THE INVENTION

This invention is accomplished in combination with the knockout plate of an injection molding machine. The knockout plate has a first face and a second face. The faces are parallel to one another. A standard pattern of holes extends through the plate from face to face.

A socket bolt has a head to bear against the first face, a shank to pass through and fit in one of the holes, and a threaded end projecting beyond the second face. A pin passage extends through the bolt.

A retainer plate fits against the second face. It has a pattern of internally threaded holes identical to the pattern in the knockout plate. The socket bolts to be used in a selected array pass through the pin passage and are threaded into respective holes in the retainer plate. The retainer plate is not movable. It is attached to the knockout plate, and thereby provides means for attachment of the selected socket bolts to the retainer plate and thereby to the knockout plate. Now the socket bolts provide respective sockets.

It is best practice to install a socket bolt in every one of the holes, so the socket it provides can readily be used. Each knockout bar has a threaded bore in one of its ends. A latch pin is threaded into the threaded bore, and has a shank which closely fits in the passage in the socket bolt. The shank extends beyond the threaded end of the socket bolt. It has a head at its free end, with a latch groove spaced from the end.

A latch plate lies against the retainer plate, mounted for in-plane axial movement relative to it. A pattern of keyhole slots similar to the pattern of holes in the knockout plate is provided. Each keyhole slot has an enlarged opening to pass the head of the latch pin in one position of the latch plate and an axially extending slot to engage in the groove and trap the head in another position of the latch plate. All of the slots are parallel, and extend axially in the direction of movement of the latch plate.

Means is provided to move each latch plate (there usually will be more than one in the larger machines). Preferably these are powered means, for example a fluid motor or a solenoid. Other means are mechanical movements such as cams, and even handles to enable the plates to be moved.

Removal and replacement of knockout bars now requires no more than moving the latch plate to release the latch pins, removing and replacing latch pins as required, and then moving the latch plate to its latched position. The savings in time and effort are very substantial.

The above and other features of this invention will be fully understood from the following detailed description and the accompanying drawings, in which:

DETAILED DESCRIPTION OF THE INVENTION

Figure 1:
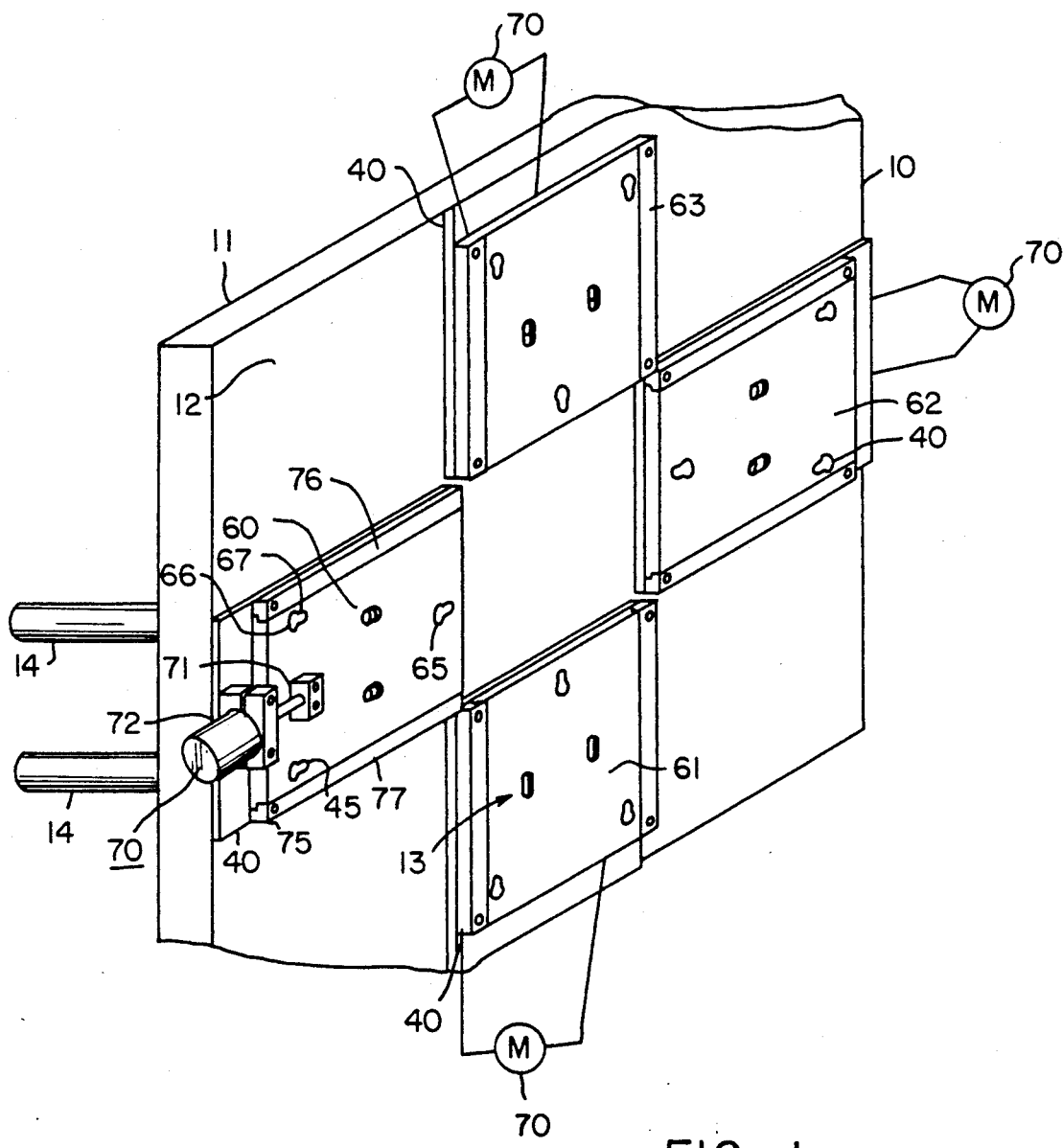
FIG. 1 is a perspective view of the presently-preferred embodiment of the invention.
Figure 2:
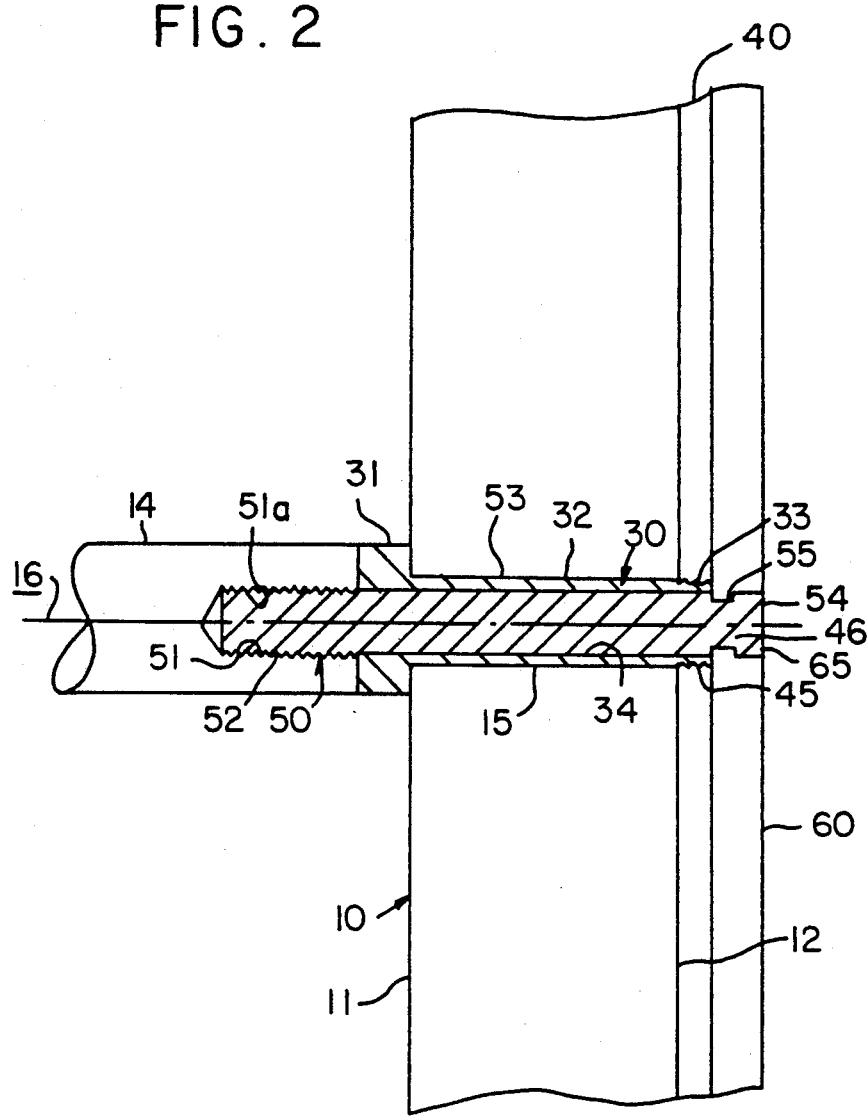
FIG. 2 is a fragmentary cross-section taken at line 2—2 in FIG. 1.

FIGS. 1 and 2 show a flat knockout plate 10. It has a first face 11 and a second face 12. An array of holes 13 is formed in a pattern which is standard in the industry. The purpose of this invention is to facilitate the removal and installation of knockout bars 14 at holes 15 Where a knockout bar is desired. The holes extend axially along axis 16 of movement of the knockout plate when in operation.

Holes 15 are provided in an industry-standard array. All knockout bars will be located in one of these holes. The number and location of holes at which knockout bars are provided are determined by the mold and machine characteristics.

Figure 3:
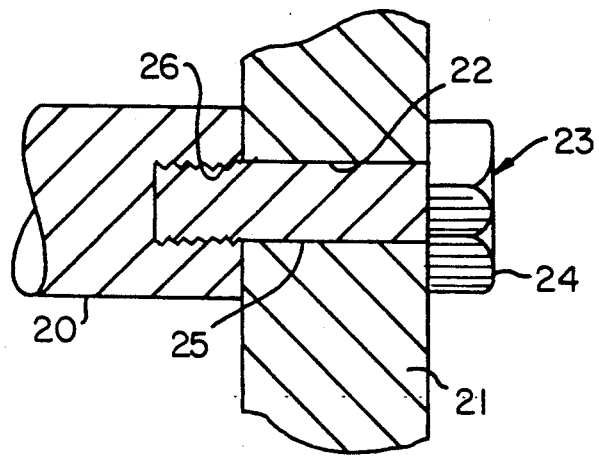
FIG. 3 is an axial cross-section showing the prior art.

FIG. 3 shows the prior art technique for attaching a knockout bar 20 in a knockout plate 21 with a hole 22 therethrough. A bolt 23 with a head 24, a shank 25 and a thread is inserted in the hole, and the thread is threaded into a bore 26 in the knockout bar. The prior art installation thereby involves passing the pin into the hole, reaching on both sides of the plate, lining up the knockout bar and the bolt, and holding the pin against rotation while inserting and tightening down the bolt. In an actual mach±ne this is much more difficult than it sounds.

This invention provides a socket bolt 30, for each hole that is to be used on the knockout plate. A typical installation is shown in FIG. 2. This bolt has a head 31 to bear against the first face of the knockout plate. It also has a cylindrical shank 82 to fit in the hole, and an external thread 33 at its unheaded end. A pin passage 84 extends through the socket bolt from end to end.

A retainer plate 40 fits snugly and flat against the second face of the knockout plate. While it can be held in place by the socket bolts, it is better practice for it also to be attached to the knockout plate by other means such as screws or other fasteners (not shown) in the event that at some time all of the socket bolts are removed at once.

The retainer plate has an array of openings 45 geometrically similar to the standard array of holes for knockout plates. Internal threads 46 are formed in each of these openings to receive and engage the threads on respective socket bolts. Each socket bolt now provides a socket located at a respective hole location on the standard array.

A latch pin 50 is provided for each location where a knockout bar is to be located. Latch pin 50 in FIG. 2 is exemplary of all of them. Installed, it forms a threaded stud 51 at one end adapted to enter into and engage a thread 51A in a bore 52 in the end of the knockout bar. The latch pin has a cylindrical shank 53 which closely fits in the pin passage 34, a head 64 at its other end, and a latch groove 55 spaced from the other end. When the latch pin is made to the proper dimensions, the groove stands adjacent to the end of the socket bolt, and the head stands spaced from this end by a distance just sufficient to receive latch plate 60.

Latch plate 60 is a flat plate slidably fitted against the retainer plate. There usually will be more than one of these latch plates, depending on the size and geometry of the machine. In the illustrated embodiment there are three others: plates 61,62 and 63. These are all identical, and only plate 60 will be described in detail.

Each latch plate has an array of latch apertures 65, one each of these apertures being disposed at each location of a hole in the knockout plate. Each aperture has an enlarged opening 66 and a slot 67. This is a keyhole shape. Opening 66 Will pass the head of a latch pin. Slot 67 Will engage in the groove on the latch pin and prevent removal of the latch pin. The slots are all aligned on the axis of movement of the respective latch plate. In FIG. 1 each plate has its own axis of movement.

Latching of the latch pin and thereby the mounting of the latch pins to the knockout plate is accomplished by shifting the respective latch plate to align openings 66 with the latch pin, fully inserting the latch pins, and then shifting the latch plate to lock the latch pins in place.

This can be done manually by pushing or striking the latch plates to move them. This is within the scope of the invention. Adaptation for this purpose includes such rudimentary provisions am a surface to be struck, or more effective means such as the bi-directional piston/cylinder motor 70 shown in FIG. 1. In this arrangement the piston rod 71 is coupled to the latch plate. The cylinder 72 is coupled to the knockout plate. Then hydraulic fluid applied appropriately to the motor will shift the plate to latch or to unlatch the latch pins as a group.

Instead of a fluid motor, electrical solenoids may be provided as another means for remote actuation. Alternatively, mechanical means such as cams and leVers can be provided.

The latch plates are mounted to the knockout plates through the retention plates by fasteners 75, which also mount keyways 76,77 that slidingly retain the latch plates for the sliding inplane movement.

In FIG. 1, only one power means is shown. It is to be understood that identical means, or other means as described, should be provided for all of the latch plates.

Figure 4:
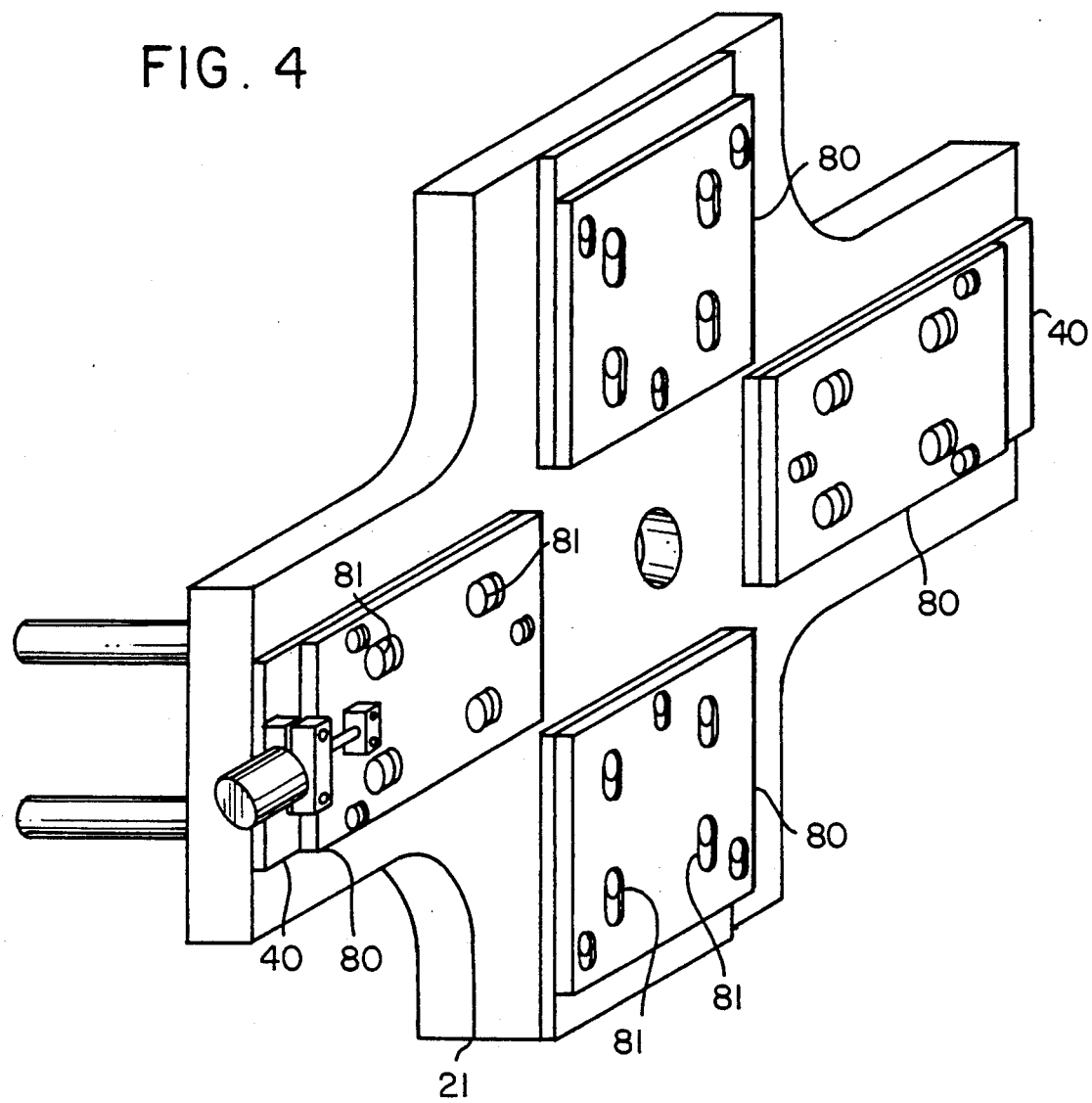
FIG. 4 shows an alternate means for mounting the latch plate.
Figure 5:
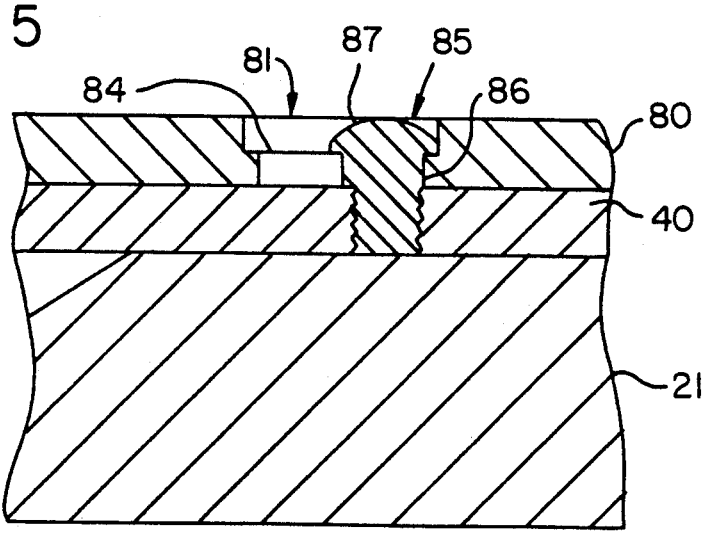
FIG. 5 is a cross-section taken at line 5—5 in FIG. 4.

This means for mounting the latch plate to the knockout plate in FIG. 1, while elegant, is costlier than it needs to be. FIGS. 4 and 5 show a latch plate 80 similar in all regards to latch plate 60 except that it is further provided with a plurality of parallel slots 81. Slots 81 are preferably sunk into surface 82 of the latch plate, so as to form a recess 83 and a peripheral ledge 84.

A headed bolt 85 is passed through each slot, into the retainer plate or into the knockout plate. It has a shank 86 that closely but slidably tits in the slot and a head 87 that overlays the edge. The latch plate is thereby mounted in the system, and the bolt/slot combinations substitute for the keyways of FIG. 1 and 2 as "slidable mounting means".

The term "injection molding means" is not to be limited to machines which manufacture parts from plastic or rubber, but also those which manufacture parts from molten metal. These latter machines are frequently called "die casting" machines, but are for the purposes of this specification regarded as injection "molding" machines. Both utilize similar mold mounting means and knockout bars.

This invention is not to be limited by the embodiments shown in the drawings and described in the description, which are given by way of example and not of limitation, but only in accordance with the scope of the appended claims.

I claim:

1. Mounting means for mounting knockout bars to the knockout plate of a molding machine, said knockout plate having a first face, a second face, and a standard pattern of mounting holes therethrough from face to face, said mounting means comprising;

a socket bolt having a head at one end, a shank, an external thread at the other end, and a pin passage extending from end to end, said shank fitting in said hole, said head bearing against said first face, and said thread extending beyond said second face;

a retainer plate contiguous to said second face, said retainer plate having an array of threaded holes conforming to the array of holes in the knockout plate, at least one of said socket bolts being threaded into at least one of said threaded holes;

a latch pin having a threaded end adapted to be threaded into a knockout bar, a shank slidably fitted in said pin passage, a head at the other end, and a groove adjacent to the head, spaced from said other end, said latch pin when threaded into a knockout bar and inserted into a pin passage having its respective groove adjacent to the threaded end of the socket bolt;

a latch plate contiguous to said retainer plate, said latch plate having an array of keyhole slots in an array respective to the array of holes in the knockout plate, each keyhole slot having an opening large enough to pass the head of the latch pin, and a slot of width to enter said groove but not to pass the head;

slidable mounting means mounting said latch plate to said retainer plate enabling the latch plate to move in an in-plane movement relative to the retainer plate without separation from the retainer plate; and means to move said latch plate in plane to and from a position in which the opening is aligned with the latch pin and a position in which it is not.

2. Apparatus according to claim 1 in which said means to said latch plate comprises power means.

3. Apparatus according to claim 2 in which said power means a fluid motor coupled between said knockout plate and said latch plate.

4. Apparatus according to claim 2 in which said power means comprises an electrical solenoid.

5. Apparatus according to claim I in which said slidable mounting means is a keyway mounting said latch plate to said knockout plate.

6. Apparatus according to claim 1 in which said slidable mounting means is a slot and a headed bolt, said bolt passing through the slot for guidance of the latch plate, and the head of said bolt overhanging said latch plate to hold the latch plate to the retainer plate.

* * * * *